US008265980B2

(12) United States Patent
Ochs et al.

(10) Patent No.: US 8,265,980 B2
(45) Date of Patent: Sep. 11, 2012

(54) WORKFLOW MODEL FOR COORDINATING THE RECOVERY OF IT OUTAGES BASED ON INTEGRATED RECOVERY PLANS

(75) Inventors: Georg Ochs, Moetzingen (DE); Juergen P. Schneider, Althengstett (DE); Thomas Starz, Gartringen (DE); Jeremias Werner, Ehningen (DE)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 12/427,083

(22) Filed: Apr. 21, 2009

(65) Prior Publication Data
US 2010/0268568 A1    Oct. 21, 2010

(51) Int. Cl.
*G07F 7/00* (2006.01)
*G06F 11/00* (2006.01)

(52) U.S. Cl. ...... 705/7.27; 705/1.1; 705/7.12; 705/7.29; 709/224; 709/228; 714/48; 714/26; 707/674; 707/686

(58) Field of Classification Search .................. 709/224, 709/228; 705/1, 7, 9; 714/48, 26; 707/674–686
See application file for complete search history.

(56) References Cited

U.S. PATENT DOCUMENTS

| | | | |
|---|---|---|---|
| 6,243,835 B1 | 6/2001 | Enokido et al. | |
| 6,574,605 B1 * | 6/2003 | Sanders et al. | ............... 705/7.26 |
| 6,725,399 B1 | 4/2004 | Bowman | |
| 6,742,166 B2 | 5/2004 | Foster et al. | |
| 7,065,493 B1 * | 6/2006 | Homsi | ......................... 705/7.26 |
| 7,139,629 B2 | 11/2006 | Fromherz et al. | |
| 7,386,752 B1 | 6/2008 | Rakic et al. | |
| 7,426,616 B2 | 9/2008 | Keeton et al. | |
| 7,467,198 B2 | 12/2008 | Goodman et al. | |
| 7,509,519 B2 | 3/2009 | Srivastava et al. | |
| 7,580,994 B1 * | 8/2009 | Fiszman et al. | ............... 709/223 |

(Continued)

FOREIGN PATENT DOCUMENTS
EP    1669872 B1    3/2008

OTHER PUBLICATIONS

Casati, "Specificatoin and Implementation of Exception in workflow management systems", Sep. 1999, ACM, pp. 405-451.*

(Continued)

*Primary Examiner* — Scott Baderman
*Assistant Examiner* — Jeison C Arcos
(74) *Attorney, Agent, or Firm* — Yee & Associates, P.C.; Jeffrey S. LaBaw (57) ABSTRACT

One aspect of the present invention provides a workflow model to effectively respond to outage events within an IT infrastructure. This workflow model enables a combination of manual and automated processing to effectively deploy a flexible, plannable, and testable recovery to outages and problems encountered within IT infrastructure settings. In one embodiment, a shared processing context is created to accompany the operations of the workflow, thereby collecting useful data in one location related to events and status information during the outage and the outage response. Within the workflow, analysis of the outage event is performed, an appropriate recovery plan is selected, the selected recovery plan is implemented, and recovery to the outage event is completed. Data collected within the processing context can be analyzed to obtain post mortem analysis and continuous service improvements. Accordingly, the improvements can be implemented within the IT infrastructure directly or within the appropriate recovery plan.

3 Claims, 9 Drawing Sheets

U.S. PATENT DOCUMENTS

| | | | |
|---|---|---|---|
| 2002/0010803 A1* | 1/2002 | Oberstein et al. | 709/318 |
| 2003/0144867 A1* | 7/2003 | Campbell et al. | 705/1 |
| 2003/0200527 A1* | 10/2003 | Lynn et al. | 717/102 |
| 2004/0019512 A1* | 1/2004 | Nonaka | 705/8 |
| 2004/0064436 A1 | 4/2004 | Breslin et al. | |
| 2004/0083448 A1* | 4/2004 | Schulz et al. | 717/101 |
| 2005/0154735 A1* | 7/2005 | Breh et al. | 707/10 |
| 2006/0067252 A1* | 3/2006 | John et al. | 370/261 |
| 2006/0143024 A1 | 6/2006 | Salle et al. | |
| 2006/0224629 A1 | 10/2006 | Alexander et al. | |
| 2007/0006327 A1* | 1/2007 | Lal et al. | 726/31 |
| 2007/0156487 A1* | 7/2007 | Sanabria et al. | 705/8 |
| 2007/0203778 A1* | 8/2007 | Lowson et al. | 705/9 |
| 2007/0245357 A1* | 10/2007 | Breiter et al. | 719/320 |
| 2008/0015889 A1 | 1/2008 | Fenster | |
| 2008/0082863 A1 | 4/2008 | Coldicott et al. | |
| 2008/0120521 A1 | 5/2008 | Poisson et al. | |
| 2008/0140495 A1 | 6/2008 | Bhamidipaty et al. | |
| 2008/0189125 A1 | 8/2008 | Wainwright | |
| 2008/0189154 A1 | 8/2008 | Wainwright | |
| 2009/0024627 A1 | 1/2009 | King | |
| 2009/0106068 A1 | 4/2009 | Bhamidipaty et al. | |
| 2009/0171707 A1* | 7/2009 | Bobak et al. | 705/7 |
| 2009/0172460 A1 | 7/2009 | Bobak et al. | |
| 2009/0172670 A1* | 7/2009 | Bobak et al. | 718/100 |
| 2009/0172674 A1 | 7/2009 | Bobak et al. | |

OTHER PUBLICATIONS

Kim, "A task pipeline framework for e0science workflow management system", 2008, IEEE, pp. 657-662.*

Chiu, "A meta modeling approach to Workflow management system supporting exection handling", 1999, Elsevier Science Ltd, pp. 159-184.*

"Business Continuity Planning for Telecoms Services". Oct. 1, 2005. Chartered Management Institute: Checklists: Operations and Quality.

"Business Continuity Planning: IT Examination Handbook". Mar. 2003. Federal Financial Institutions Examination Council.

"Business Continuity Essential Practices for Information Technology Examination Manual IT Section". Oct. 2007. Farm Credit Administration.

Kirvan, Paul. "LAN Recovery Plan Testing as Critical as the Plan". Nov. 1994. Communications News.

Edwards, Bruce; Cooper, John. "Testing the Disaster Recovery Plan". 1995. Information Management & Computer Security.vol. 3, Issue 1.

Lewis, Steven. "Proving Your Disaster Recovery Plan Works". Mar. 14, 2006.

"Risk Analysis and Disaster Recovery Plan for University Computing Services & Telecommunications & Network Services". Nov. 15, 2002. Humboldt State University.

Wold, Geoffrey H. "Disaster Recovery Planning Process". 1997. Disaster Recovery Journal. vol. 5.

Kaner, Cam. "Requirements for Test Documentation". Archived Dec. 6, 2004 retrieved from http://kaner.com/pdfs/QaiRequirements.pdf.

"Pre-Testing Disaster Recovery & Business Continuity Plans: The Network Simulation Solution". 2007. Shunra Software Ltd.

"IEEE 829—Standard for Test Documentation Overview". Gerrard Consulting. Archived Oct. 27, 2006.

Lesser, Amichai. "Network Simulation for Disaster Recovery Plan Testing". Jun. 7, 2007. Shunra.

Toigo, Jon William. "Disaster Recovery Planning for Computers and Communication Resources". 1996. John Wiley & Sons Inc.

Gregory, Peter; Rothstein, Philip Jan. "IT Disaster Recovery Planning for Dummies". Dec. 26, 2007. John Wiley & Sons.

Dolewski, Richard. "System I Disaster Recovery Planning". Apr. 1, 2008. MCPress.

Swanson, Marianne; Wohl, Amy; Pope, Lucinda; Grance, Tim; Hash, Joan; Thomas, Kay. "Contingency Planning Guide for Information Technology Systems—Recommendations of the National Institute of Standards and Technology". Jun. 2002. Institute of Standards and Technology.

"Disaster Recovery: Best Practices White Paper". Apr. 10, 2002. Cisco Systems Inc.

"What is a Test Plan—Test Plan Overview". May 2002. Coley Consulting.

Bradbury, Carl. "The IT Disaster Recovery Plan". Nov. 20, 2007. Continuity Central.

"Planning for the Unplanned: Oracle E-Business Suite Disaster Recovery Solution with VMware Site Recovery Manager and EMC CLARiiON Storage". 2008. VMWare Inc.

Egiela, "Selecting Technology for Disaster Recovery", Proceedings of the International Conference on Dependability of Computer Systems, 2006, available at http://ieeexplore.ieee.org/Xplore/login.jsp?url=/iel5/4024017/4024018/04024045.pdf?isnumber=4024018&prod=CNF&arnumber=4024045&arSt=160&ared=167&arAuthor=Cegiela%2C+R.

Lumpp et al., "From High Availability and Disaster Recovery to Business Continuity Solutions", IBM Systems Journal, vol. 47, No. 4, 2008, available at https://www.research.ibm.com/journal/sj/474/lumpp.pdf.

Tivoli Business Continuity Process Manager documentation, IBM Corporation, available at http://publib.boulder.ibm.com/infocenter/tivihelp/v10r1/topic/com.ibm.bcpm.doc/welcome.htm, published May 2B, 2008.

Tivoli Business Continuity Process Manager Version 7.1.0 Quick Start Guide, IBM Corporation, available at http://publib.boulder.ibm.com/infocenter/tivihelp/v10r1/topic/com.ibm.bcpm.doc/BCPM_qsg.pdf, published May 28, 2008.

Swanson, Marianne; Wohl, my; Pope, Lucinda; Grance, Tim; Hash, Joan; Thomas, Ray. "Contingency Planning Guide for Information Technology Systems—Recommendations of the National Institute of Standards and Technology". Jun. 2002. National Institute of Standards and Technology.

"Business Continuity Planning: BCP Preparedness Planner". Upper Mohawk, Inc.; archived: May 17, 2006; (retrieved from http://www.uppermohawkinc.com docs/BCP_Preparedness_Planner.pdf).

"Handbook for Information Technology Security Contingency Planning Procedures". Jul. 2005. US Department of Education.

"Emergency Management Guide for Business and Industry: A Step-by-Step Approach to Emergency Planning, Response and Recovery for Companies of All Sizes". Oct. 1993. FEMA.

Lennon, Elizabeth B. "Contingency Planning Guide for Information Technology Systems". Jun. 26, 2002. National Institute of Standards and Technology.

"Business Recovery Plan—Home Office: Emergency Operations Center" Dec. 14, 2001.

* cited by examiner

WORKFLOW MODEL FOR COORDINATING THE RECOVERY OF IT OUTAGES BASED ON INTEGRATED RECOVERY PLANS

FIELD OF THE INVENTION

The present invention generally relates to recovery planning utilized within a business environment. The present invention more specifically relates to the coordination of responses to IT outages through the deployment of integrated recovery plans.

BACKGROUND OF THE INVENTION

Today's businesses rely heavily on IT operations. Situations impacting businesses must be resolved quickly and reliably. Improper handling of IT problem situations could result in costly outages, impact the availability of a critical business application, or create non-compliance with operational standard requirements. An outage could impact one small component of the entire IT infrastructure with little or no impact to the business, or could span the entire infrastructure and have significant impact on the business. Business Continuity and Recovery Plans must be in place to recover from nominal to critical outages like environmental disasters, sabotages, viruses, hardware failure, etc. These plans document actions, responsibilities, and people to detect and classify such outages, and to coordinate the recovery in the best possible way.

Currently, these plans are typically plain documents, potentially unstructured and not integrated in the overall IT recovery process. However, having the right information available at the right time for the current situation is crucial to make the right decision in a timely fashion. Because a wrong or late decision in an emergency situation can have a huge impact to the safety of people and the business, enterprises must follow a pre-defined and pre-tested coordinated path of investigations, decisions, potential approvals, and recovery actions. The data as part of a recovery plan must not only be available at that time, but integrated in the flow of activities so the critical people can adapt as the situation evolves.

As a further complexity, IT service continuity workflows are typically not supported or automated by process engines. This implies that distributed sources of data and information exist. Furthermore, the information captured while proceeding through the steps of this workflow is often not stored at a single place nor is electronically usable.

Today, a large problem with the processing of workflows to address IT outages is that they either provide predefined/static sequences of work or a fully adhoc/dynamic execution of work. These two approaches are mutually exclusive. Therefore, existing solutions either provide a well-structured and testable but static workflow execution, or instead provide a workflow with great flexibility for dynamic changes but without the option of fully testing the solutions. What is needed in the art is a workflow model providing the advantages of these two approaches.

BRIEF SUMMARY OF THE INVENTION

One aspect of the present invention includes providing an execution environment to offer the best features of existing scenarios for workflow processing, enabling the advantages of both predefined sequences and dynamic executions of work. The presently disclosed execution environment enables a controlled runtime level flexibility for changes and adhoc decisions as well as possibilities for testing them. This environment further enables the right methodology between the different controlled versus adhoc execution styles. The proposed execution environment further enables integrating a recovery plan in a flow of activities (a workflow). In such a way, it is possible to automate and link a pre-defined flow of activities (e.g., workflow templates) to the actual situation encountered in the IT outage.

One embodiment of the present invention provides such a configuration through use of an execution engine that is based on a combination of workflow processing technics and interpretation of data definitions, to produce an expansive workflow model. The workflow flow engine in combination with a set of actions is further used to provide an interpreter, by having the interpreter assemble the preplanned and pre-tested steps to an execution stream. This execution stream could be modified by a set of data values which could either come from user input or IT infrastructure related behavior.

When an outage occurs, a set of predefined activities are performed to analyze the kind of outage taking place, to notify the subject matter experts, and to collect a set of information that can be used by the crisis management team during outage analysis. This provides a methodology to choice the appropriate recovery path according to the actual event. In one embodiment, an algorithm analyzes the outage event and the impacted IT infrastructure, classifies the workflow context object, and notifies the people affected by the outage. To implement a high level of flexibility, a dispatcher is utilized to assign the appropriate analysis flow according to the classification of the actual outage.

Once the outage has been analyzed and the crisis management team has been notified by the analysis flow, the preplanned and pre-tested recovery plan comes into place. The crisis management team may then execute a selection algorithm to choose the appropriate recovery plan. One embodiment of the present invention provides a set of actions that assembles the preplanned and pre-tested steps of the recovery plan to an execution stream when the recovery plan is linked to the workflow context object. The execution stream depends on a set of data values defined in the recovery plan. For example, the recovery plan defines whether the recovery procedure needs to be approved or not. Depending on that preplanned and pre-tested flag, the approval path will be executed or not. The execution stream may also be modified by user input and IT infrastructure behavior.

Additionally, the interpreter considers whether the outage is simulated or not and assembles the appropriate activities to an execution stream. The execution stream depends on the test run and the actual simulated outage scenario. Therefore, the recovery flow can be separated from the IT infrastructure. The interpreter algorithm also tracks the decisions and choices made during workflow processing. The information captured in the workflow context object is then stored in an electronically-processable form. These information and measurements can be used to implement further process improvements.

DETAILED DESCRIPTION OF THE INVENTION

One aspect of the present invention includes an enhanced execution environment for workflow processing for use with an IT recovery plan. Some of the advantages of the present invention include: (a) enabling a controlled runtime level flexibility for changes and adhoc decisions; (b) allowing plannable and testable solutions; and (c) providing the right methodology for the different execution style problems (controlled versus adhoc). The presently described embodiments enable deployment of a well-structured, plannable, and testable recovery, in addition to enabling great flexibility to the recovery plan through its dynamic characteristics.

Use and Structure of Recovery Plans

In existing non-automated systems, relevant information to analyze and respond to a problem is spread among various people and exists in different and isolated formats. This results in loosely coupled information that is often only available in printed form, or even worse, unavailable because the information is only known by a few specific individuals. Additionally, what information is available is typically outdated and does not reflect the current IT infrastructure or business needs. In these scenarios, the decision process to select the right and optimized recovery options during a real disaster takes a significant time, and is neither reliable nor reproducible.

Existing automated processes for determining an appropriate recovery plan are narrowly tailored to specific outages, rigid in their application of solutions, and based on costs associated with various contracts impacted by the outage. These automated solutions are incapable of incorporating lessons learned from historical outages and unable to select an appropriate recovery plan based on the relationships the failing resource might have. One aspect of the present invention therefore provides a significant improvement over the prior art by integrating all information and knowledge in an electronic format that is easily updated with new information as it becomes available.

A recovery plan is first typically created by a recovery planning team. This recovery plan ideally represents the collection of all knowledge captured during the IT service continuity planning. Using a recovery plan, this knowledge can be classified and related to certain configuration items such as business systems or other major hardware and software elements. For example, the planning process might identify that the accounting application runs on a particular server in a particular building that accesses across the company's intranet. These classification and relation capabilities make it possible to easily and quickly find relevant information and interconnections when they are needed during an outage analysis process.

Additionally, the notion of a recovery plan also introduces the possibility to plan for a variety of predefined options that can be applied in a real outage situation. Determining which option is actually best suited to recover from a particular disaster can be decided at the time all analysis has been completed. This combines the strict planning that is done when establishing the recovery plan with the possibility of adjusting the actual process that is needed in a particular situation and reacting according to current needs.

Making the recovery plan available as an IT manageable data record makes it possible to implement controlled plan management and audit functions. It therefore also enables benchmarking, post-mortem analysis, and compliance checking. It further relates the planning, the business, and service level agreements.

Figure 1:
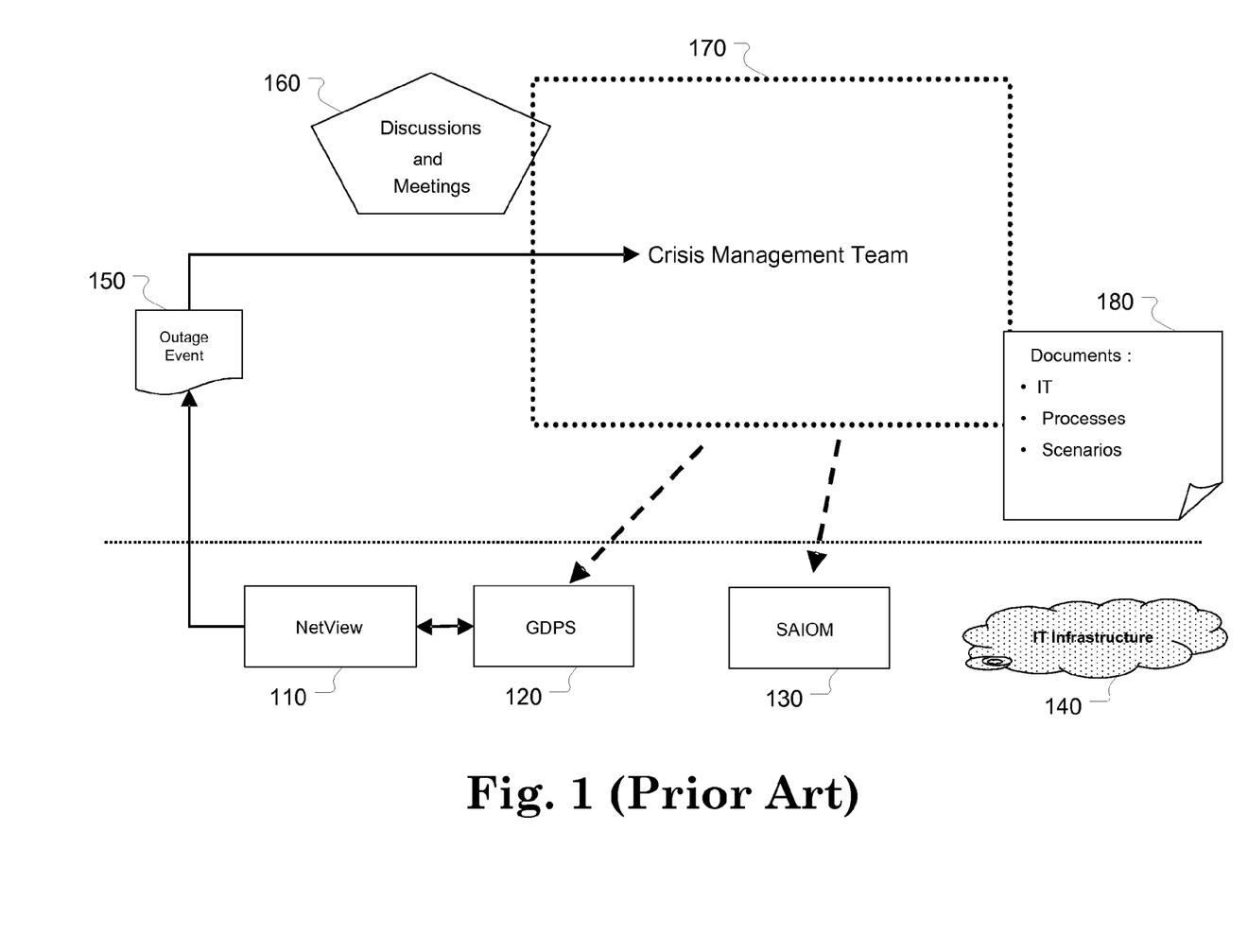
FIG. 1 illustrates an example block diagram of paper based recovery plans being applied to an outage according to methods existing in the prior art.

FIG. 1 depicts a typical configuration in the prior art of an example technical infrastructure and process used to respond to outages. The example technical infrastructure contains IBM® products NetView 110, GDPS 120, and SA IOM 130, although a similar infrastructure could easily be substituted by other vendor products or other platforms.

NetView 110 is used to intercept and communicate failure events, and serves as a central point where events can be intercepted and routed to various places. GDPS 120 covers a set of disciplines in an outage scenario for a given IT infrastructure, monitoring IT infrastructure. Based on this monitoring, outages are detected and events are sent via NetView 110. GDPS 120 is policy driven, and contains knowledge about the controlled IT infrastructure 140. This knowledge is used to retrieve information about the current controlled IT infrastructure 140 that is stored in the common data model for later processing. Additionally, GDPS 120 allows the trigger of recovery actions. This functionality is used during outage processing to recover from an outage. Examples include restarting a system or a group of systems either in the primary site or on a backup site. Similarly, SA IOM 130 is used to automate certain tasks based on NetView events, and notify relevant persons via various media such as cell phone, SMS, or pagers.

As further illustrated within FIG. 1, with non-automated systems in the prior art, an outage event 150 triggers discussions and meetings 160 among actors in a crisis management team 170. During this meeting, all decisions are made based on a written recovery plan that is only available in printed format. The crisis management team determines what actions to take relative to the IT infrastructure 140. However, because the crisis management team is relying on a set of printed documents 180 that may be out of date, the crisis management team does not know the current status and layout of the IT infrastructure 140, the decisions made and the resulting consequences from previous outages, or even if the printed documents 180 still identify the correct people to handle the outage.

A recovery plan optimally integrates information needed for decision processes. The main idea behind a recovery plan is to link the available information about enterprises, people, and organizations with business related information and knowledge about the IT infrastructure to keep the business running while minimizing monetary losses and loss of the business's goodwill. To accomplish these objectives, one embodiment of the present invention utilizes workflow technologies to engage all the correct people involved across the various aspects of the enterprise. This enables each party to participate in a coordinated fashion to resolve the outage and an extensive data model to incorporate information necessary for the decision process.

Workflow processes allow the knowledge experts to define automated activities in response to outages that integrate all the appropriate parties. One aspect of implementing a workflow solution is storing real-time data about the outage in a common context data object. This data object is used to save and share all information that is collected during the outage. This means this data store is filled step by step with all information that is related to the outage as the appropriate people respond to the outage. Furthermore, the object can coordinate efforts to resolve the outage by using automated notifications and escalation mechanisms. A very critical part about the context data object is that it is shared across all the processing steps. This allows the people addressed by the workflow to participate and contribute to this context. Accordingly, data which is added to the context is visible to all parties of the workflow.

A further embodiment incorporates data available before the outage even occurs. This includes recovery plans that have been laid out and tested by a recovery planning team and historical information related to the execution of these recovery plans. This aspect provides the set of parameters that interact with the real-time data to dynamically influence the steps in the workflow.

As a prerequisite for a reliable impact analysis and to select the most appropriate recovery option, the underlying IT infrastructure must be available in easily displayable, electronically processible form. To achieve this, automated discovery mechanisms are used to generate integrated, homogeneous, up-to-date views of the IT infrastructure. Prerequisites here are the use of a common data model which enables sharing and using information across the different ITIL (Information Technology Infrastructure Library) disciplines and management tasks. (ITIL describes a set of best practices for disciplines, roles, responsibilities, and processes for IT infrastructure management).

Figure 2:
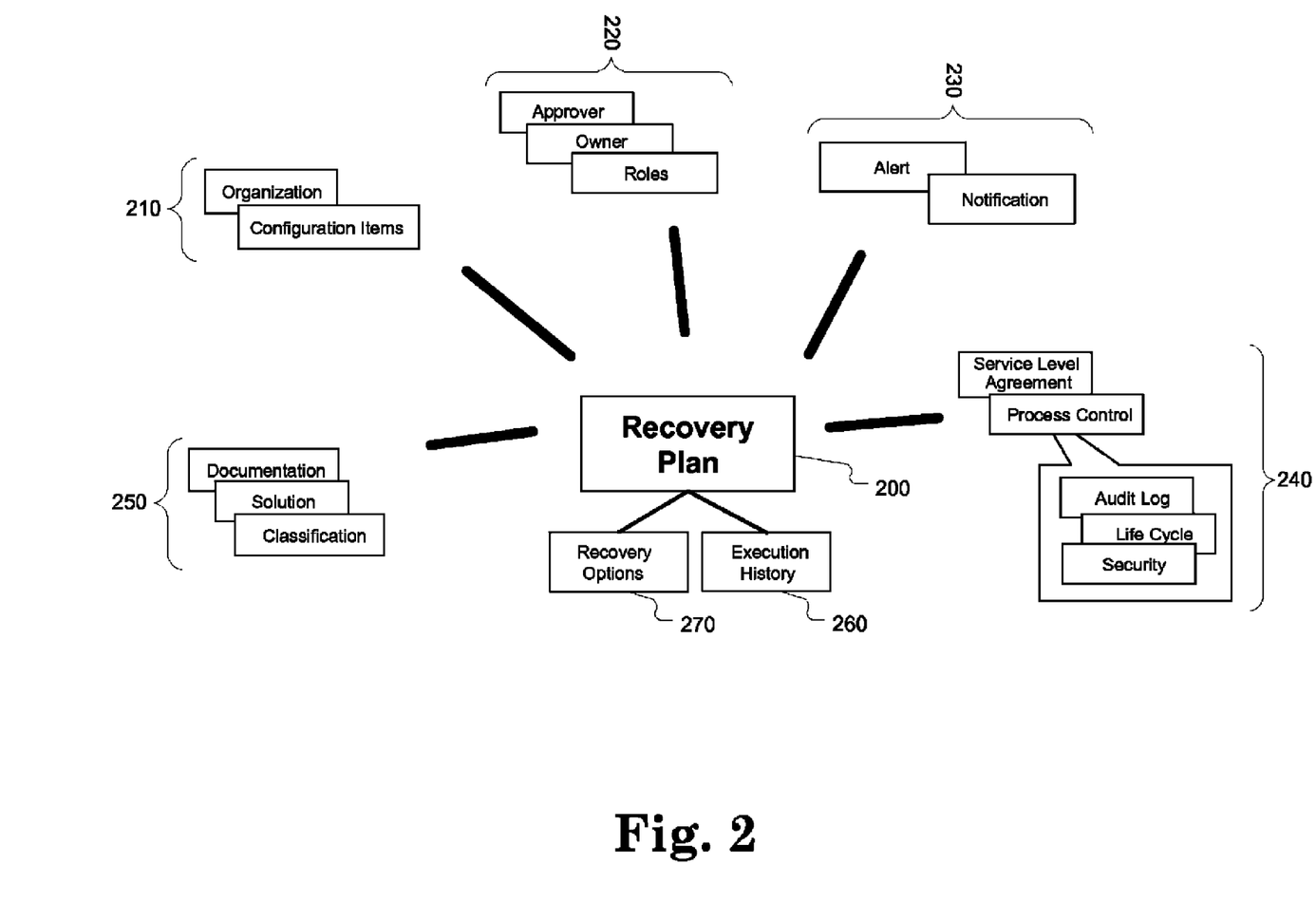
FIG. 2 illustrates an example block diagram representing information input into a recovery plan and elements of the recovery plan to be executed during an outage in accordance with one embodiment of the present invention.

FIG. 2 depicts the elements of a recovery plan 200 which may be used to perform the various analysis processes used for recovery in accordance with one embodiment of the present invention. The starting point of the analysis is the recovery plan 200. A recovery plan 200 holds all information about the type of event it is designed for, attachments relevant to the recovery steps, the roles that are responsible for approval or where to escalate to, and a Service Level Agreement (SLA). A recovery plan also contains various relationships to data items. Some of the elements related to a recovery plan could be divided in the following areas:

IT infrastructure related data 210. This includes Configuration Items such as servers, business applications, disks, and their relationships.

Organization related data 220. This includes People, Roles, Organization, Sites, Locations, and Responsibilities.

Execution related data 230. This includes recovery options, alerts and notifications, solution information (cause of the problem, responses to the problem, and problem descriptions) and classification information.

Business related data 240. This includes Service Level Agreements (SLAs), Importance of applications.

Documentation data 250. This includes all documents which are directly related to a recovery plan and helpful or required during planning or execution of an outage scenario.

Historical and audit data 260. This includes all prior execution histories and all modifications to a recovery plan.

Process related data 270. This would be owner and status information and associated recovery options.

During outage analysis, a recovery plan becomes associated to a work order, and thus is related to an actual outage situation. The actual options that can be selected to recover from a certain situation are also contained in the recovery plan.

Figure 3:
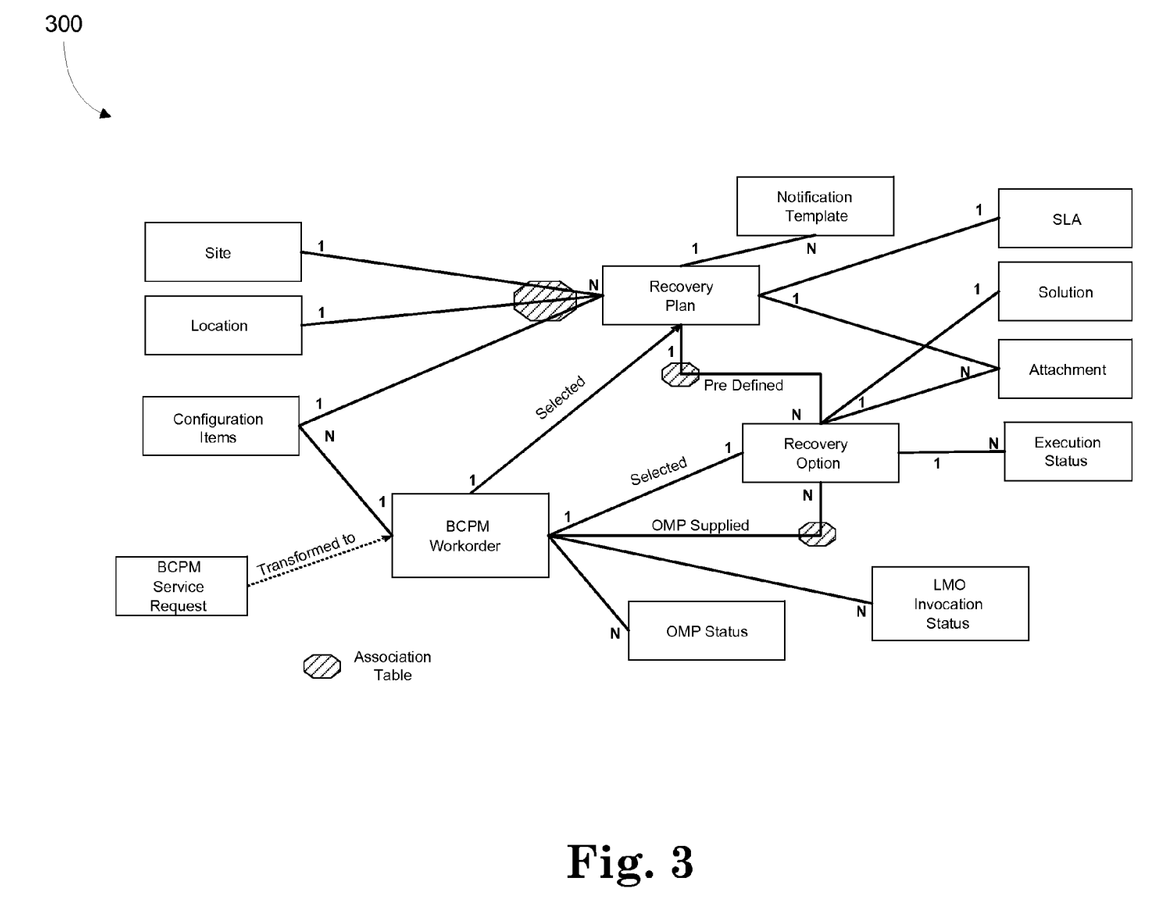
FIG. 3 illustrates an example block diagram representing the relationships between the various data elements incorporated into the recovery plan in accordance with one embodiment of the present invention.

FIG. 3 depicts the relationships and associations between data elements incorporated into a recovery plan in accordance with one embodiment of the present invention. A data model for configuration items (CIs) generally covers the following elements:

Type of the configuration item. E.g., Server, Disk, Application, Network, Software, etc.

Attributes of a configuration item. E.g., for a Server, the number of processors, memory size.

Relationships to other configuration items. E.g. installed on, runs on, uses, contains, depends on.

Location information. E.g. location (building, floor, room), site (E.g. Stuttgart, Frankfurt)

A recovery plan can then be associated with the following IT infrastructure elements:

Specific CIs
Collection of CIs
All CIs related to a specific location
All CIs related to a specific site The hierarchy would be CI→Collection of CIs→Location→Site. The following description further details the data relationships and the function of the various stored data items, walking through FIG. 3 clockwise from bottom left to the right.

Each outage event creates a service request. The service request instantiates a work order object which is the base context for the complete outage processing. Each work order could contain one or more configuration item which failed. In addition, a work order could have the following information based on the source which triggered the outage:

(a) A set of status information of resources or configuration items (Operational Management Product (OMP) Status). This describes the live status as seen by the originator of the outage event;

(b) A set of recovery options. These options could be offered by the originator of the outage event. For example, GDPS offers a set of possible choices from its point of view when the outage happens (OMPsupplied Recovery options);

(c) A LMO invocation status. During execution of recovery plans and options it is very likely that there are interactions between the different system management products which are required to resolve the outage. This kind of interaction is logged and the LMO invocation status tracks this information; and (d) Selected recovery plan and recovery options. During outage analysis, the selection algorithms provide a list of possible recovery plans and options. The final decision is done by an analyst. The work order stores this decision.

Recovery plan: A recovery plan could be related to configuration items. In addition, the recovery plan contains the following data elements:

(a) Lists with notification templates. This notification template describes a standard letter with the possibility of variables which are resolved at the moment the letter is sent. The variable could refer to all data elements which are reachable from the work order. This includes all data element reachable from the work order via relationships. This results in a network of data which could be used inside the communication templates. Communication templates could have attachments.

(b) Service Level Agreement (SLA). Each recovery plan is associated with a SLA. The SLA enables a description of the goals and contract, to build SLAs in a structured way.

(c) Solution. A solution describes a problem and its resolution. Solutions could be classified and searched. A solution is composed out of a symptom, cause, and resolution description.

(d) Attachments. Attachments could be any files or hyperlinks. Attachments are stored together with data records. This allows context specific documents or hyperlinks to be provided.

(e) Status. Each plan has a status set assigned to it. An example for a status could be draft, active, waiting for approval, inactive.

(f) Description. Each plan could have a short and a long description which provides a textual description.

(g) Site. A recovery plan could be scoped to a site or valid for all sites if this value is blank.

Recovery Option: A recovery plan could have multiple recovery options. A recovery option is an anchor for any kind of work management functionality. Recovery options could be predefined during a planning phase or provided by system management software which triggers an outage event. A recovery option could have the following data elements attached:

(a) Work management function. A work management function could be a workflow, a jobplan, or a set of actions.

(b) Status. Each option has a status set assigned to it. An example for a status could be draft, active, waiting for approval, inactive.

(c) Description. Each option could have a short and a long description which provides a textual description.

(d) Solution. A solution describes a problem and its resolution. Solutions can be classified and searched. A solution is composed out of a symptom, cause, and resolution description.

(e) Attachment. Attachments could be any files or hyperlinks. Attachments are stored together with a data records. This allows access to context specific documents or hyperlinks.

(f) Execution status. At any time when a recovery option is executed an execution status is written. This is a historical record about current or previous executions. It contains date and time of execution, status of execution and person who executed the recovery option. The execution status is subdivided between test and real outage execution.

Workflow Management to Enable Successful Execution of Recovery Plans

Orchestrating execution of recovery plans is one of the critical elements needed for successful recovery to outage events. On the one hand, a strict recovery plan sequence is desired; on the other hand, it should be possible to react on unexpected situations which may arise during outage situations. To address these contradicting requirements, the following embodiments of the present invention provide a workflow model solution to address both of these requirements.

During the execution of a recovery plan, multiple and different roles need to be deployed to fully participate and contribute to the recovery process. It is vital that it is possible to track the ongoing execution and provide key performance indicators (KPIs) about the current process of execution. If errors occur during execution, it should be possible to adapt the current process and apply changes in a controlled manner.

Figure 4:
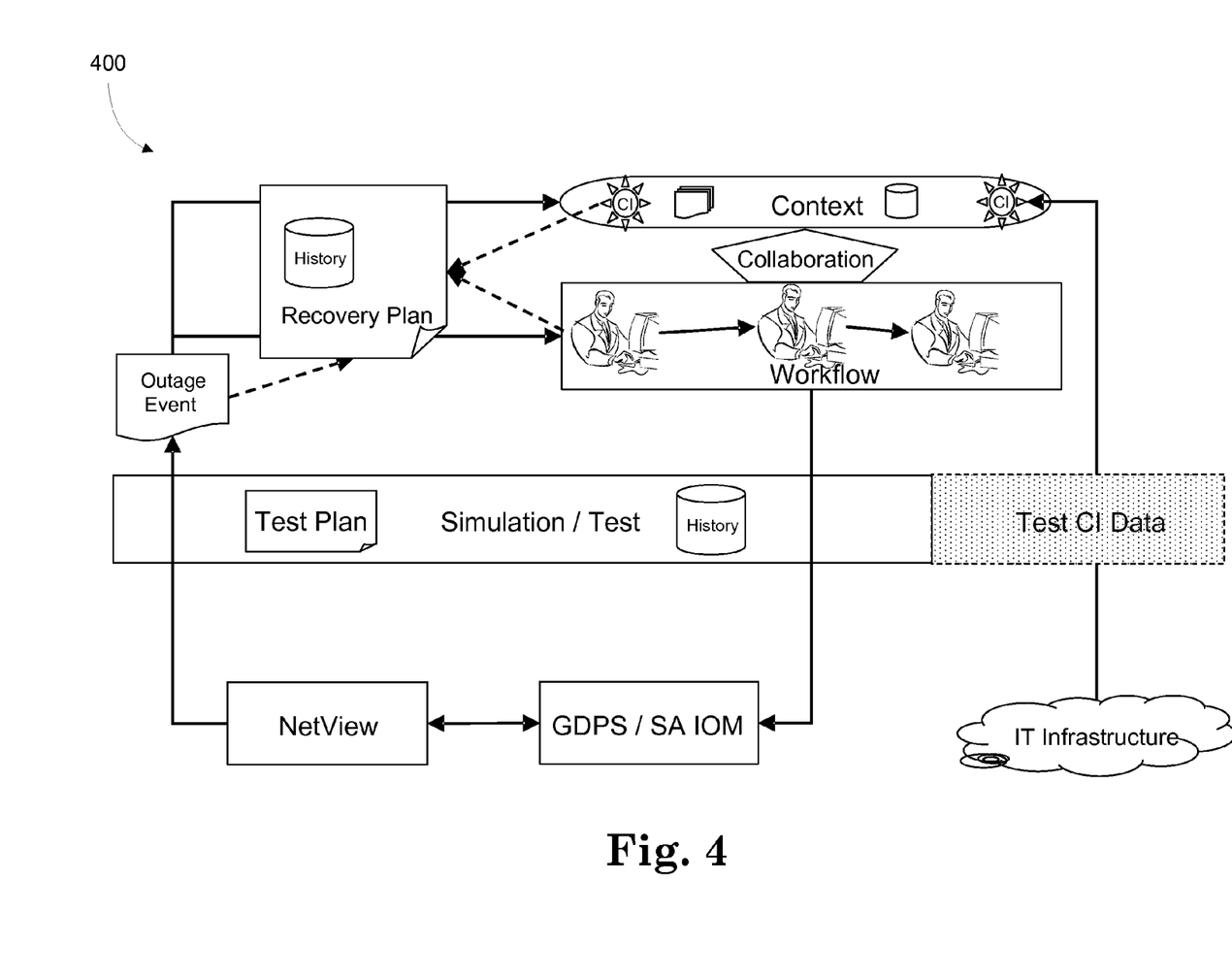
FIG. 4 illustrates an workflow model for coordinating IT outage recovery based on integrated recovery plans according to one embodiment of the present invention.

FIG. 4 depicts a workflow model for coordinating IT outage recovery based on integrated recovery plans according to one embodiment of the present invention. As illustrated, an outage event triggers the initial creation of a processing context which is shared throughout the complete recovery. In addition, a workflow is started with the context (a work order) that will be enriched during recovery processing. This main workflow structures the various activities that will occur during recovery processing.

Each major step in the master workflow adds additional data to the overall context. This context includes: the outage event which triggers the recovery processing; failing resources; status of critical resources; the recovery options which the origination Operational Management Product (OMP) offers as a solution; and contact information for the OMP (such as connection parameters and the like).

During execution of the main workflow, many different roles defined in the ITIL operate together to solve the problem. In outage situations, these roles are resolved to actual persons based on the site/location of the outage, or based on the outage event or outage type.

In a further embodiment, the workflow is performed through use of an execution engine which is based on a combination of workflow processing technics and an interpreter for data definitions. The workflow flow engine in combination with a set of actions is used within this embodiment to serve as an interpreter. This interpreter then assembles the preplanned and pre-tested steps to an execution stream. This execution stream could be modified by a set of data values which could either come from user input or IT infrastructure related behavior.

As an example of this execution stream, when an outage occurs, a set of predefined activities are performed to analyze the kind of outage, to notify the subject matter experts, and to collect a set of information that can be used by the crisis management team during outage analysis. This embodiment further provides a methodology to choose the appropriate recovery path according to the actual event. Therefore, an algorithm analyzes the outage event and the impacted IT infrastructure, classifies the workflow context object, and notifies the people affected by the outage. To implement a high level of flexibility, a dispatcher is implemented to assign the appropriate analysis flow according to the classification of the actual outage.

Once the outage has been analyzed and the crisis management team has been notified by the analysis flow, the preplanned and pre-tested recovery plan comes into place. The crisis management team executes a selection algorithm to choose the appropriate recovery plan. When the recovery plan is linked to the workflow context object, a set of actions is then provided to assemble the preplanned and pre-tested steps of the recovery plan to within the execution stream. The execution stream depends on a set of data values defined in the recovery plan. For example, the recovery plan defines whether the recovery procedure needs to be approved or not. Depending on the results of the preplanned and pre-tested steps, the approval path will or will not be executed.

Furthermore, in one embodiment, the interpreter considers whether the outage is simulated or not, and assembles the appropriate activities to an execution stream. The execution stream depends on the test run and the actual simulated outage scenario. Therefore, the recovery flow can be separated from the IT infrastructure. The interpreter algorithm also tracks the decisions and choices made during workflow processing. The information captured in the workflow context object is then stored in an electronically processable form. This information and measurements can be used to implement further process improvements.

Figure 5:
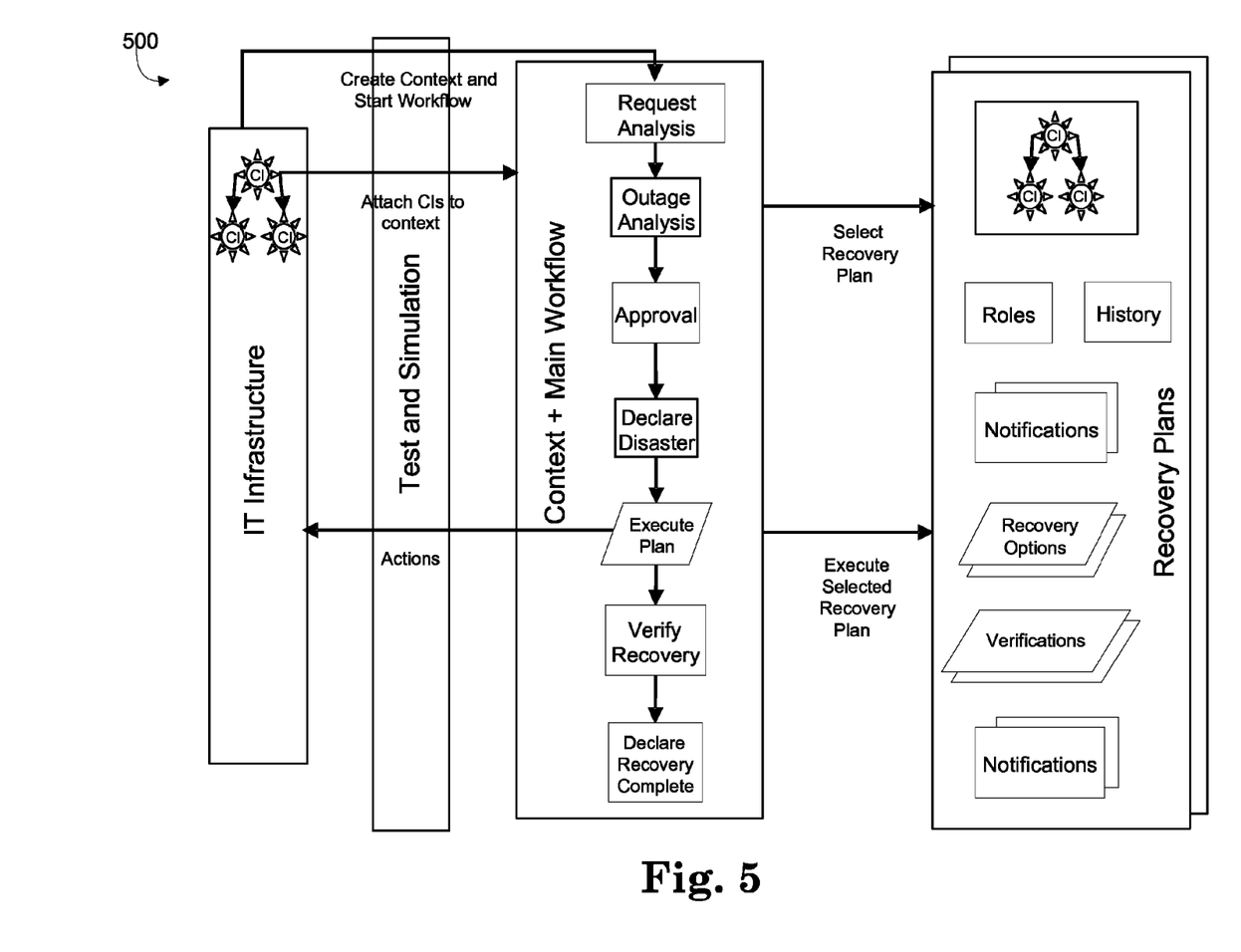
FIG. 5 illustrates major steps performed within an example workflow according to one embodiment of the present invention.

FIG. 5 provides an additional diagram which depicts the major steps in the workflow according to one embodiment of the present invention, as follows:

1) Creation of the context and start of the workflow;
2) Automated request analysis based on the incoming outage event;
3) Manual outage analysis and selection of the recovery plan and recovery options. This includes the conclusion phase which triggers one of the following actions: close request; open incident; open request for change (RFC); or execution of the recovery plan;

4) Approval of the current selected recovery plan and options;

5) Declaration of the disaster with notification of the impacted persons;

6) Automated execution of the recovery plan and the selected recovery options;

7) Automated execution of the verification process; and

8) Declaration of recovery completion (and optionally, the creation of incidents or request for changes (RFC)).

The main actions being performed against the recovery plan(s) are: 1) Selecting the best matching recovery plan and recovery options based on outage event and recovery plan database; and 2) Execution of the selected recovery plan and recovery options.

Figure 6:
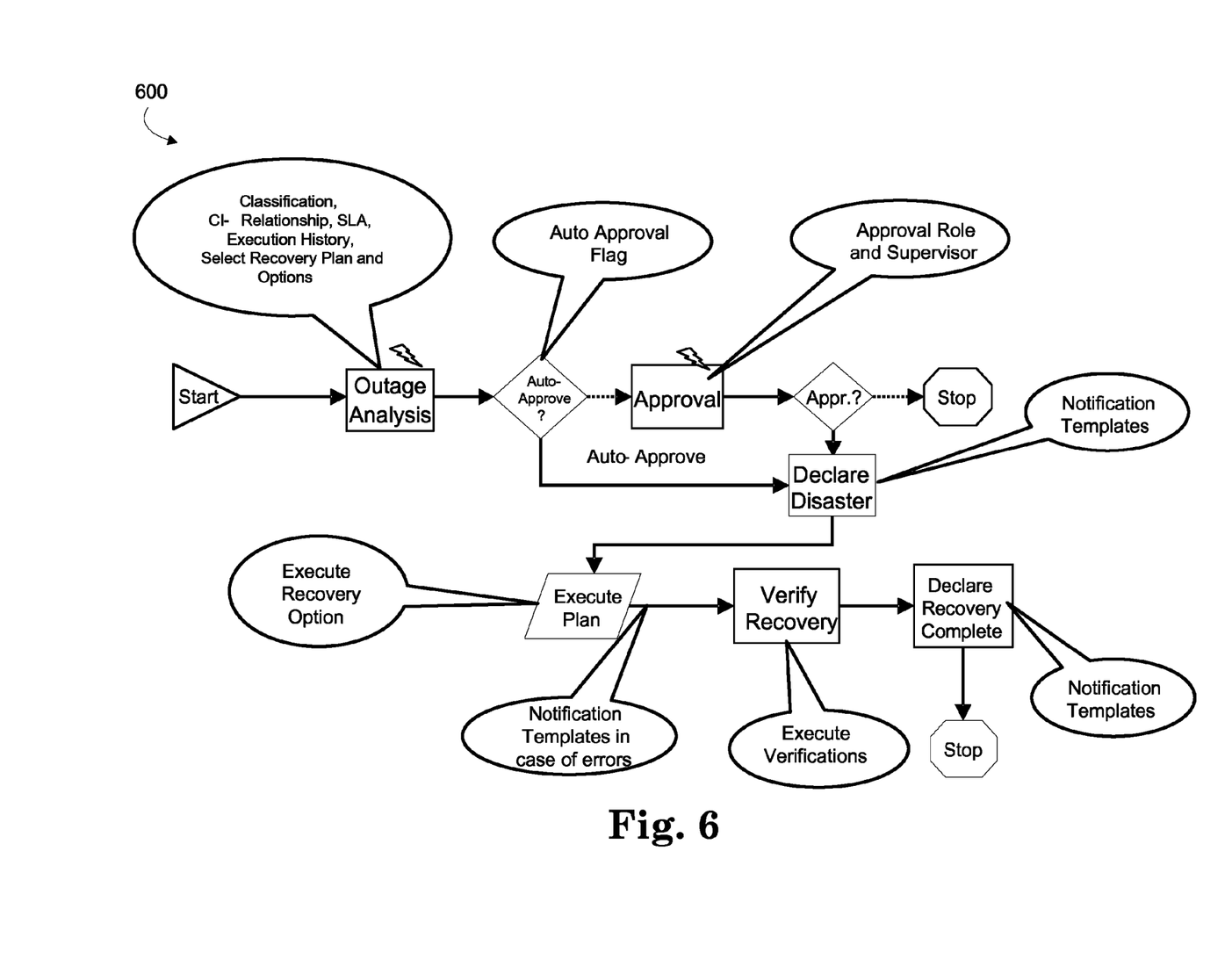
FIG. 6 illustrates major steps performed within an example workflow in addition to contextual elements which modify the behavior of the workflow execution according to one embodiment of the present invention.
Figure 7:
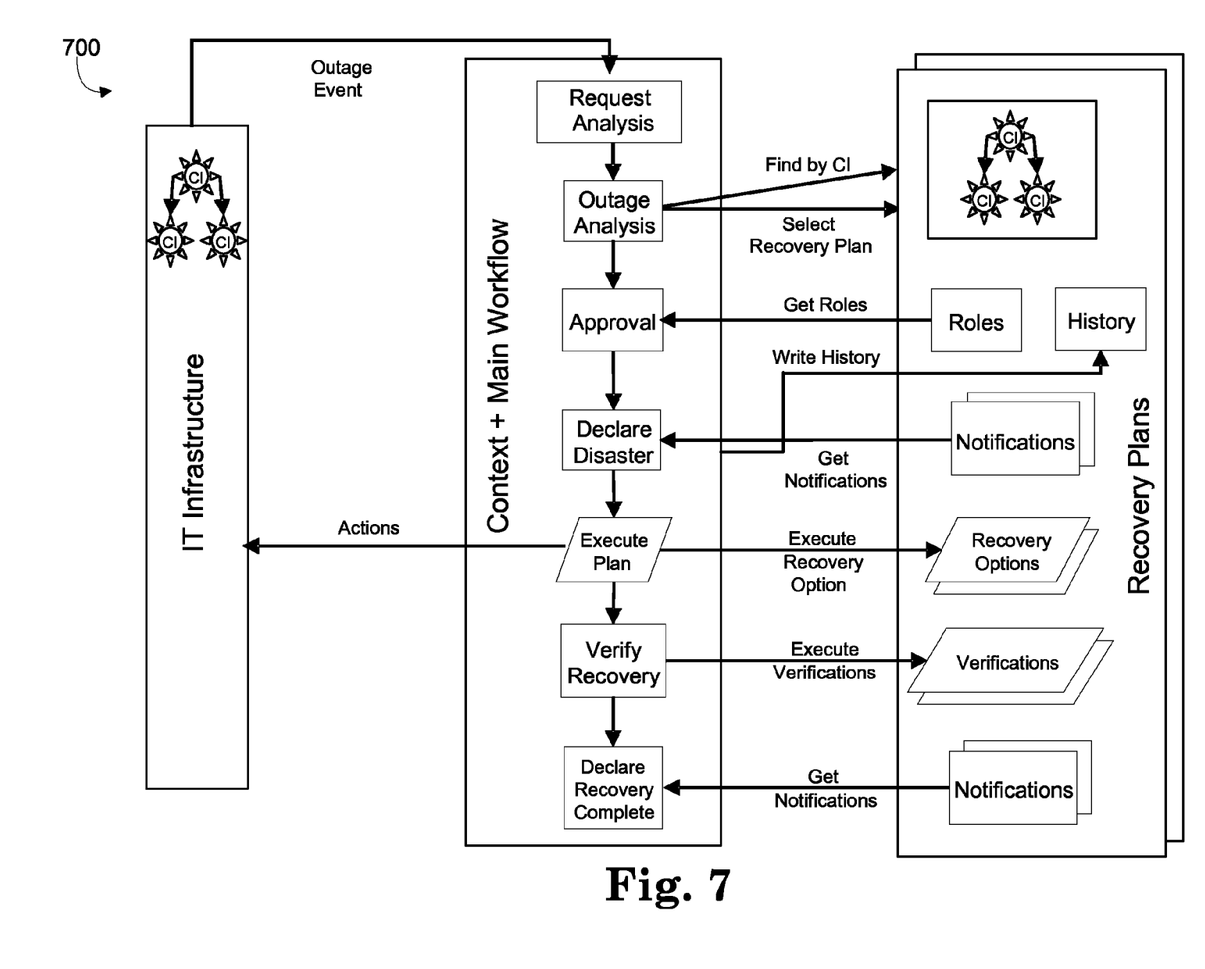
FIG. 7 illustrates major steps performed within an example workflow in addition to elements of the selected recovery plan which modify the behavior of the workflow execution according to one embodiment of the present invention.

As further examples, FIG. 6 depicts the major steps in the main workflow together with the elements in the context which modify the behavior of the workflow execution according to one embodiment of the present invention. FIG. 7 depicts the major steps in the main workflow, illustrating which elements in the selected recovery plan modify the behavior of the workflow execution according to one embodiment of the present invention.

Figure 8:
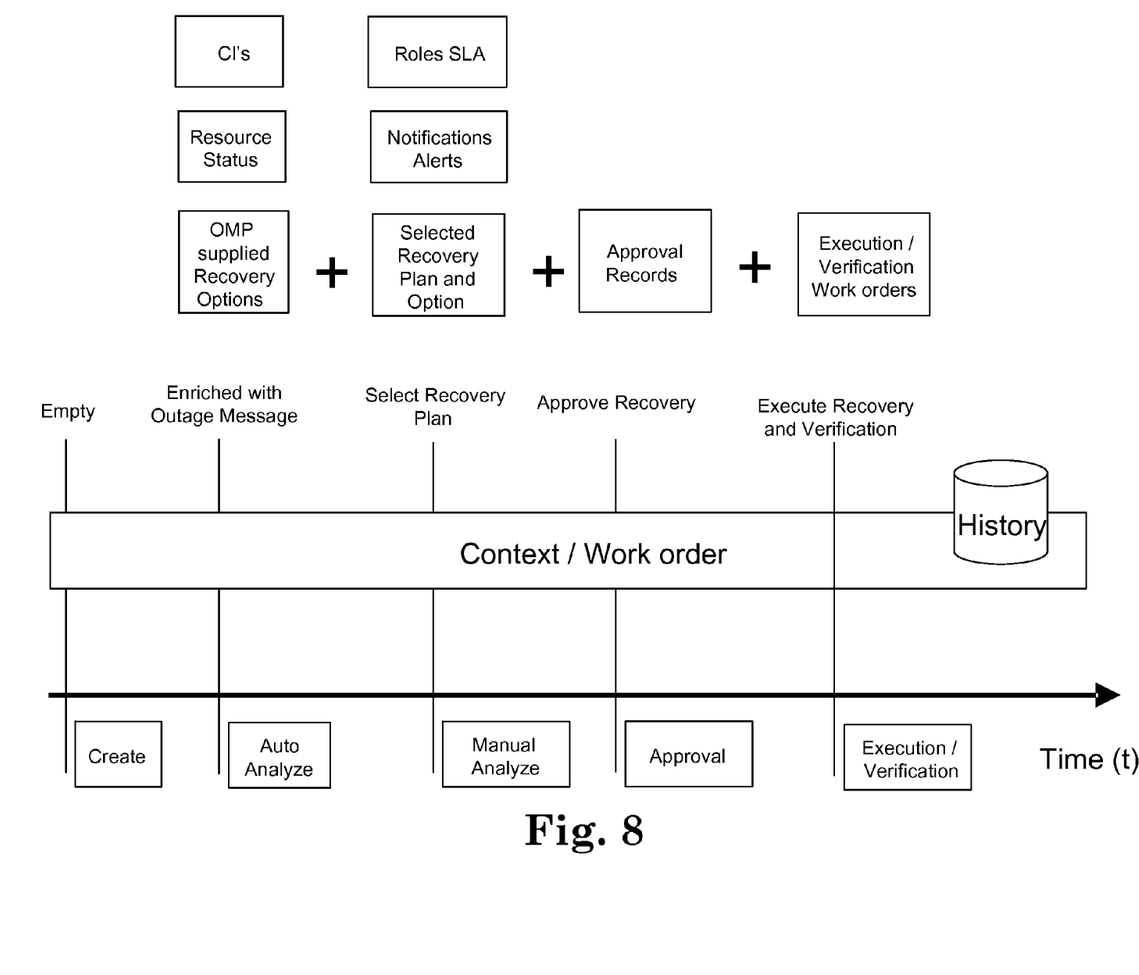
FIG. 8 illustrates a timeline of the execution context from creation until end for an example workflow according to one embodiment of the present invention.

FIG. 8 depicts the timeline of the execution context from creation until end within the workflow according to one embodiment of the present invention. The depicted timeline includes the following steps:

1) Create an empty context;

2) Enrich the context enriched by an automated request analysis phase. This adds data related to the following elements to the context: a) outage event and outage type; b) failing resources; c) status of critical resources; d) OMP-supplied recovery options; e) contact information, such as name and contact information for the OMP which triggered the outage event;

3) Manual analysis. In this embodiment, based on the automated analysis, the analyst role will be resolved to a concrete person. This person enhances the context based on manual steps (e.g., consulting documentation, interaction with other OMPs (such as monitoring)). In addition, this person selects the recovery plan and the recovery options which should be executed. Further, the person is the master of the conclusion phase. This person decides the next steps which should be done, such as: closing the request; creating an incident based on the current analysis work; creating a request for change (RFC) based on the current analysis work; continuing the execution processing and performing the next steps in the main workflow.

4) Approval. The list of persons which are defined in the recovery plan need to approve the current decisions of the recovery before the next steps will be executed. Their approvals are recorded in the context; and 5) Execute recovery. The recovery plan describes the steps which should be executed during recovery and verification. All steps and the outcome are recorded for post mortem analysis.

All steps executed by the main workflow and configured by the recovery plan are recorded and journaled. This history information allows a display of the current progress and provides the base for Key Performance Indicators (KPIs) and visualizations of the progress of execution. Additionally, all steps could be monitored for SLA violations and successful execution.

Therefore, in this embodiment, the overall processing is based on the following concepts: a master workflow which structures the major steps of the outage processing; a recovery plan which configures or modifies certain steps in the outage processing; and a shared context which provides all affected roles and execution steps with the required information. Everyone is able to participate and contribute to this context.

The context is also stored for post mortem analysis and continuous service improvement (CSI). Therefore, the context produces a combination of data from: predefined execution steps; interpretation of data in the recovery plan; configuration of the execution steps based on the selected recovery plan; extending the major workflow based on the defined steps in the recovery option for recovery and verification processing; and conditional execution of steps in the main workflow based on recovery plan settings.

Figure 9:
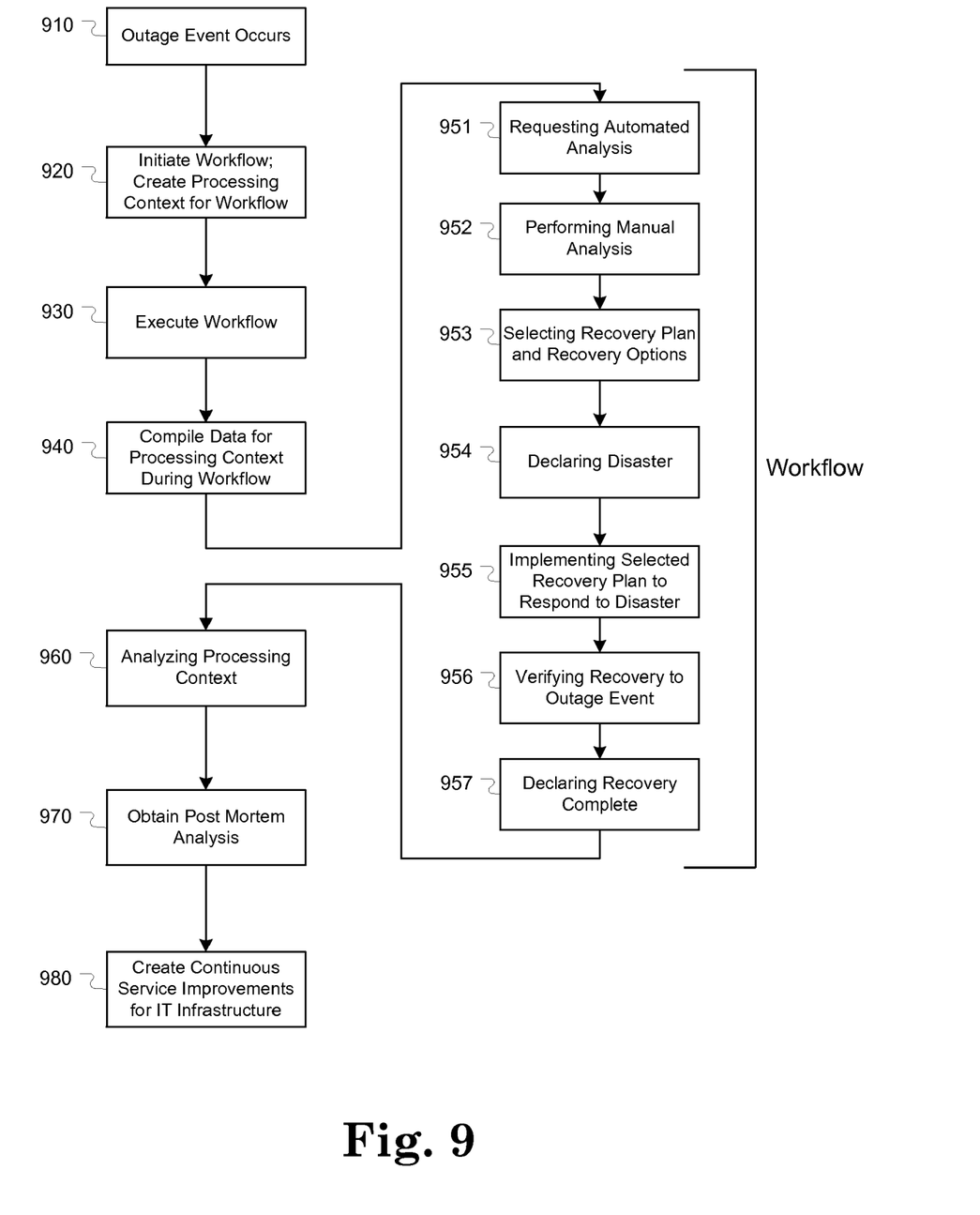
FIG. 9 illustrates an example flowchart of an operation for creating a recovery plan model to integrate information needed for utilizing a workflow model for coordinating the recovery of IT outages based on integrated recovery plans in accordance with one embodiment of the present invention.

FIG. 9 depicts a flowchart for deploying a workflow model to coordinate the recovery of IT outages through execution of an integrated recovery plans in accordance with one embodiment of the present invention. As illustrated, the workflow contains the following steps to fully coordinate the recovery of IT outages and produce usable context data for further analysis and improvements. Those skilled in the art would recognize that the following steps may be performed within the scope of the present invention in a varying sequence, or with suitable omissions, additions, and substitutions.

First, as in step 910, an outage event occurs within the IT infrastructure. As in step 920, the workflow will be initiated responsive to the occurrence of this outage event, and an accompanying processing context will be created for the workflow. This workflow context is used to collect a large amount of data related to the outage and the result of various operations performed by a recovery plan. Specifically, the data collected within this context includes data related to the outage event, outage type, failed resources within the IT infrastructure, status of critical resources within the IT infrastructure, recovery options supplied by operational management products, and contact information for the operational management products.

As in step 930, the workflow will be executed. During the execution of the workflow, as in step 940, data will be collected and compiled within the processing context according to the operations performed and the status of the outage within the IT infrastructure.

The execution of the workflow includes the following steps: requesting automated analysis of the outage event as in step 951; performing manual analysis as in step 952; selecting a recovery plan and recovery options as in step 953; declaring a disaster as in step 954; implementing the selected recovery plan to recovery from the outage event as in step 955; verifying recovery to the outage event within the IT infrastructure through verification of results of the selected recovery plan implementation as in step 956; and declaring the recovery complete as in step 957 once the recovery to the outage event has been verified.

Once the workflow is complete, the data collected through the processing context can be analyzed and extracted as in step 960. A post mortem analysis is performed as in step 970 to determine whether the steps performed within the recovery plan were fully successful, efficient, and/or complete. Continuous Service Improvements for the IT infrastructure can be created as in step 980 from this data and the context generally to improve quality of the recovery plan and responses to outage events in general.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, the present invention may take the form of a computer program product embodied in any tangible medium of expression having computer usable program code embodied in the medium.

The present invention has previously been described with reference to flowchart illustrations and block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method of deploying a workflow model to coordinate recovery of an outage within an IT infrastructure through execution of an integrated recovery plan, comprising:
    initiating a workflow responsive to the occurrence of an outage event;
    creating a processing context for the workflow;
    adding data to the processing context throughout the workflow related to the outage event, outage type, failed resources within the IT infrastructure, status of certain resources within the IT infrastructure, recovery options supplied by an operational management product, and contact information for the operational management product;
    executing the workflow, including performing the steps of:
        requesting automated analysis of the outage event to enrich the processing context;
        engaging one or more responsible parties to manually perform analysis of the outage event and select a recovery plan from a plurality of recovery plans;
        obtaining approval of the selected recovery plan from one or more decision making parties defined within the selected recovery plan;
        declaring a disaster by utilizing notification templates defined within the selected recovery plan;
        implementing the selected recovery plan upon the IT infrastructure to recover from the outage event, including executing recovery options within the selected recovery plan;
        verifying recovery to the outage event within the IT infrastructure by performing verifications upon results of the selected recovery plan implementation; and
        declaring recovery complete responsive to obtaining notifications produced by execution of the selected recovery plan; and
    analyzing the processing context to obtain post mortem analysis of recovery to the outage event with the selected recovery plan and to create continuous service improvements for the IT infrastructure.

2. A system for deploying a workflow model to coordinate recovery of an outage within an IT infrastructure through execution of an integrated recovery plan, the system comprising a data processor coupled to a memory that includes instructions that are operable by the data processor to perform steps of:
    initiating a workflow responsive to the occurrence of an outage event, wherein the data related to the outage event comprises outage type, failed resources within the IT infrastructure, status of certain resources within the IT infrastructure, recovery options supplied by an operational management product, and contact information for the operational management product;
    creating a processing context for the workflow;
    executing the workflow;
    responsive to executing the workflow, adding data to the processing context related to the outage event; and
    analyzing the processing context to obtain post mortem analysis of recovery to the outage event with a recovery plan.

3. A computer program product comprising, a non-transitory computer readable storage device having stored therein instructions that are operable to coordinate recovery of an outage within an IT infrastructure through execution of an integrated recovery plan, wherein the instructions are operable to perform steps of:
    initiating a workflow responsive to the occurrence of an outage event, wherein the data related to the outage event comprises outage type, failed resources within the IT infrastructure, status of certain resources within the IT infrastructure, recovery options supplied by an operational management product, and contact information for the operational management product;
    creating a processing context for the workflow;
    executing the workflow;
    responsive to executing the workflow, adding data to the processing context related to the outage event; and
    analyzing the processing context to obtain post mortem analysis of recovery to the outage event with a recovery plan.

* * * * *